US012573925B2

(12) United States Patent
Zhang

(10) Patent No.: US 12,573,925 B2
(45) Date of Patent: Mar. 10, 2026

(54) ASSEMBLY FOR VARNISH INJECTION OF A VEHICLE MOTOR

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 711 days.

(21) Appl. No.: 17/969,330

(22) Filed: Oct. 19, 2022

(65) Prior Publication Data

US 2024/0136899 A1 Apr. 25, 2024
US 2024/0235344 A9 Jul. 11, 2024

(51) Int. Cl.
| | |
|---|---|
| *B05C 7/02* | (2006.01) |
| *B29C 45/00* | (2006.01) |
| *B29C 45/14* | (2006.01) |
| *H02K 15/12* | (2025.01) |
| *B29L 31/00* | (2006.01) |

(52) U.S. Cl.
CPC ............... *H02K 15/12* (2013.01); *B05C 7/02* (2013.01); *B29C 45/0046* (2013.01); *B29C 45/14336* (2013.01); *B29C 45/14549* (2013.01); *B29L 2031/749* (2013.01)

(58) Field of Classification Search
None
See application file for complete search history.

(56) References Cited

U.S. PATENT DOCUMENTS

| | | | | |
|---|---|---|---|---|
| 5,685,910 A | * | 11/1997 | Thigpen | H02K 15/12 |
| | | | | 118/712 |
| 10,063,118 B2 | | 8/2018 | Yoshida et al. | |
| 10,658,884 B2 | * | 5/2020 | Honjo | H02K 3/12 |
| 2006/0165879 A1 | * | 7/2006 | Kimura | H02K 15/12 |
| | | | | 427/104 |
| 2013/0095232 A1 | * | 4/2013 | Kaiser | H02K 15/12 |
| | | | | 427/104 |
| 2016/0126816 A1 | * | 5/2016 | Kimura | H02K 15/12 |
| | | | | 118/58 |
| 2016/0322879 A1 | * | 11/2016 | Kinoshita | H02K 15/12 |
| 2017/0110916 A1 | | 4/2017 | Matsumoto | |
| 2019/0097506 A1 | * | 3/2019 | Hashimoto | H02K 15/12 |
| 2022/0094248 A1 | * | 3/2022 | Kobayashi | H02K 15/12 |
| 2022/0123615 A1 | | 4/2022 | Masfaraud et al. | |
| 2023/0198352 A1 | * | 6/2023 | Shin | H02K 15/12 |
| | | | | 29/596 |

FOREIGN PATENT DOCUMENTS

JP 2001292555 A * 10/2001

* cited by examiner

*Primary Examiner* — Binu Thomas
(74) *Attorney, Agent, or Firm* — Burris Law, PLLC

(57) ABSTRACT

A motor assembly tool includes a stator defining a plurality of slots and a varnish application fixture. The fixture includes a disc defining a plurality of slots, an outer shield disposed on the disc radially outward of the slots of the disc, and an inner shield disposed on the disc radially inward of the slots on the disc. The disc is disposed on the stator and the outer and inner shields are configured to direct varnish through the slots of the disc and into the slots of the stator.

19 Claims, 4 Drawing Sheets

ASSEMBLY FOR VARNISH INJECTION OF A VEHICLE MOTOR

FIELD

The present disclosure relates to electric motors, and more particularly to maintenance of electric motor components.

BACKGROUND

The statements in this section merely provide background information related to the present disclosure and may not constitute prior art.

Electric propulsion systems in vehicles use electric motors to propel the vehicle as an alternative or in addition to internal combustion engines. Generally, varnish is applied to the electric motors to protect against corrosion and contaminant, thereby improving an operation life of the electric propulsion system. The varnish can be applied with a machine designed to apply the varnish to the various components of the motors. During application, varnish may flow away from an intended location or component that uses the varnish, increasing the total amount of varnish used and potentially disrupting operation of other parts of the electric motor.

The present disclosure addresses challenges related to varnish application to electric motors.

SUMMARY

This section provides a general summary of the disclosure and is not a comprehensive disclosure of its full scope or all of its features.

In one form, a motor assembly tool includes a stator defining a plurality of slots and a varnish application fixture. The varnish application fixture includes a disc defining a plurality of slots, an outer shield disposed on the disc radially outward of the slots of the disc, and an inner shield disposed on the disc radially inward of the slots on the disc. The disc is disposed on the stator and the outer and inner shields are configured to direct varnish through the slots of the disc and into the slots of the stator.

In variations of the motor assembly tool, which may be implemented individually or in combination: further including a plurality of wires, each of the plurality of wires extending through each of the plurality of slots of the stator; each wire includes a paper layer, the paper layer extending through the respective slot of the disc in which the wire is disposed; the outer shield comprises a sloped surface sloped toward a center portion of the disc and defines a plurality of holes to direct varnish to the slots of the disc; the slots of the stator define an outer circumference and an inner circumference, and the outer shield extends around the outer circumference of the slots; the outer shield is arranged to align the sloped surface with a varnish injector disposed radially outward of the outer shield; the inner shield further comprises a sloped surface sloped away from a center portion of the disc and defines a plurality of holes to direct varnish into the slots of the disc; the slots of the stator define an outer circumference and an inner circumference, and the inner shield extends around the inner circumference of the slots; the inner shield is arranged to align the sloped surface with a varnish injector disposed radially inward of the inner shield; the varnish application fixture further includes a fastener extending axially through a center portion the disc radially inward of the inner shield; the disc is disposed on a first face of the stator and the varnish application fixture further includes a second disc disposed on a second face of the stator opposite the first face, the fastener connecting the disc and the second disc through an axial opening of the stator; the varnish application fixture further includes a case extending from an outer edge of the disc along an outer surface of the stator; the outer shield is configured to direct varnish radially inward into the slots of the stator and the inner shield is configured to direct varnish radially outward into the slots of the stator; a geometry of the slots of the disc conforms to a geometry of the slots of the stator.

In another form, a varnish application fixture for a stator of an electric motor includes a first portion and a second portion. The first portion includes a first disc defining a plurality of slots, a first outer shield disposed radially outward of the plurality of slots of the first disc, a first inner shield disposed radially inward of the plurality of slots of the first disc, and a first case extending from an outer edge of the first disc. The second portion includes a second disc defining a plurality of slots, a second outer shield disposed radially outward of the plurality of slots of the second disc, a second inner shield disposed radially inward of the plurality of slots of the second disc, and a second case extending from an outer edge of the second disc. The first and second portions encapsulate the stator to direct varnish through the slots of the first and second discs into the stator.

In variations of the fixture, which may be implemented individually or in combination: further including a fastener extending from a center portion of the first disc to a center portion of the second disc, the fastener joining the first and second portions to encapsulate the stator; wherein the first outer shield further comprises a surface sloped toward a center portion of the first disc and defines a plurality of holes to direct varnish into the slots of the disc; wherein the first inner shield further comprises a surface sloped away from a center portion of the first disc and defines a plurality of holes to direct varnish into the slots of the disc; further including a fastener joining the first case to the second case to encapsulate the stator.

In another form, a varnish injection tool includes a varnish injector, a stator defining a plurality of slots and including a plurality of wires disposed in the plurality of slots, and a varnish application fixture encapsulating the stator, the varnish application fixture including a channel configured to direct varnish from the varnish injector onto the wires of the stator.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
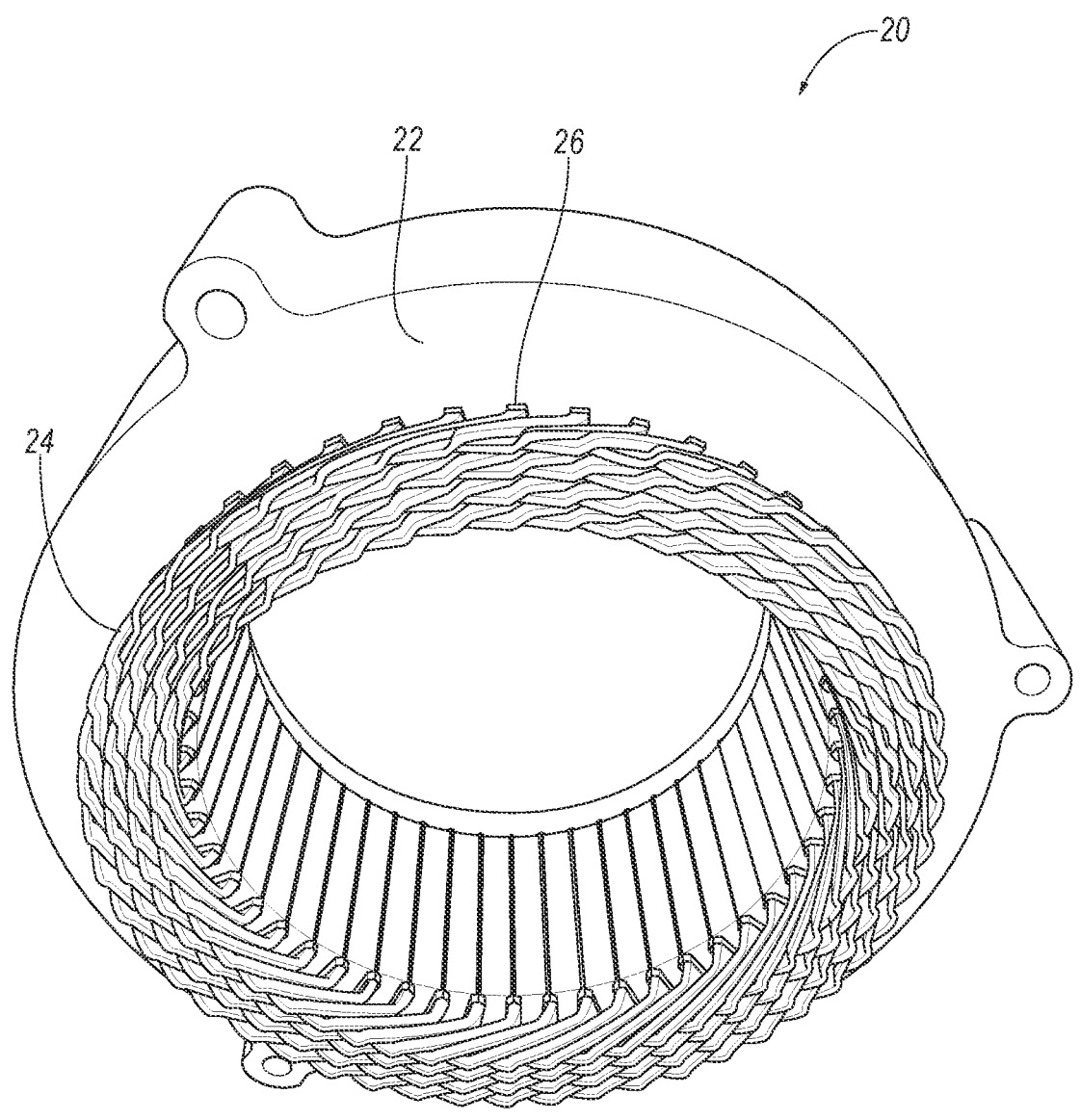
FIG. 1 is a perspective view of a stator for an electric motor according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Among other components, an electric motor includes a stator that is a stationary component generating an electromagnetic field and a rotor which rotates relative to the stator due to the electromagnetic field. In one example application, the electric motor is a component of an electric propulsion for a motor vehicle. The electric motor propels the motor vehicle by rotating one or more wheels of the motor vehicle. In one example, the electric motor is a sole propulsion of the vehicle, such as in a fully electric vehicle. Alternatively, the electric motor can be part of a hybrid propulsion that includes an internal combustion engine, such as in a hybrid-electric vehicle.

With reference to FIG. 1, an example of a stator 20 for an electric motor is illustrated and includes a stator core 22 and a plurality of wires 24. In one form, the stator core 22 defines a plurality of slots 26, and each slot 26 includes one or more wires from among the plurality of wires 24. The wires 24 are formed of an electrically conducting material such as copper. As generally known, with the wires 24 arranged in the slots 26, electric current flowing through the wires 24 generates an electromagnetic field that drives the rotor.

To inhibit corrosion or deterioration of electrical properties of the wires 24 and to improve durability of the stator by holding stator laminates and/or copper wires and/or intermediate paper layers together in a generally rigid manner, a varnish (not shown) is applied to the stator during assembly of the electric motor. The varnish is typically applied to an outermost surface of the stator core 22, and capillary action directs the flow of the varnish through the slot 26 and onto the wires 24, as well as into a gap between a surface of the slot 26 and the intermediate paper layer. Specifically, the varnish flows through spaces (i.e., capillaries) of the slot 26 by adhesion, viscosity, and/or surface tension without significant influence by, or even against, the force of gravity. The stator core 22 is rotated such that a varnish injector applying the varnish can inject the varnish to each of the slots 26 and the wires 24 therein. Controlling flow of varnish into the slots 26 may reduce a total amount of varnish used and improve manufacturing of the electric motor.

Figure 2:
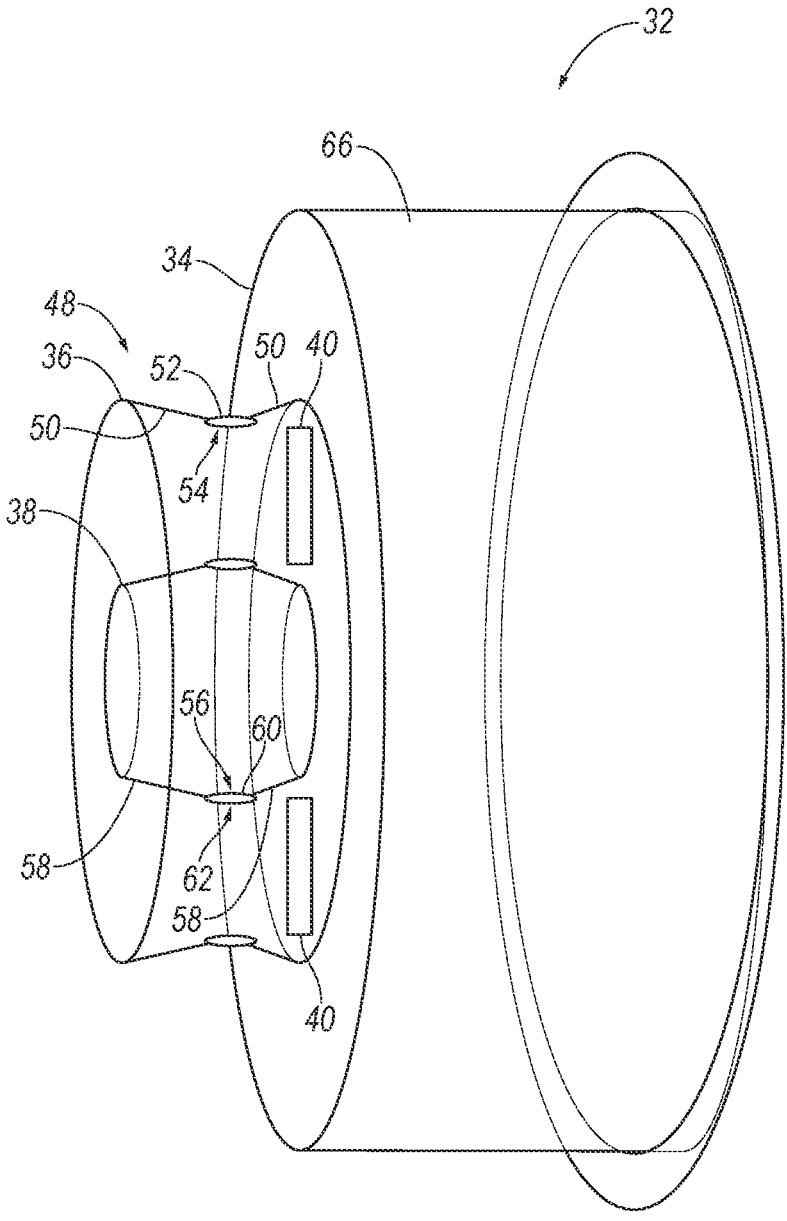
FIG. 2 is a side perspective view of a varnish application fixture according to the present disclosure.
Figure 3:
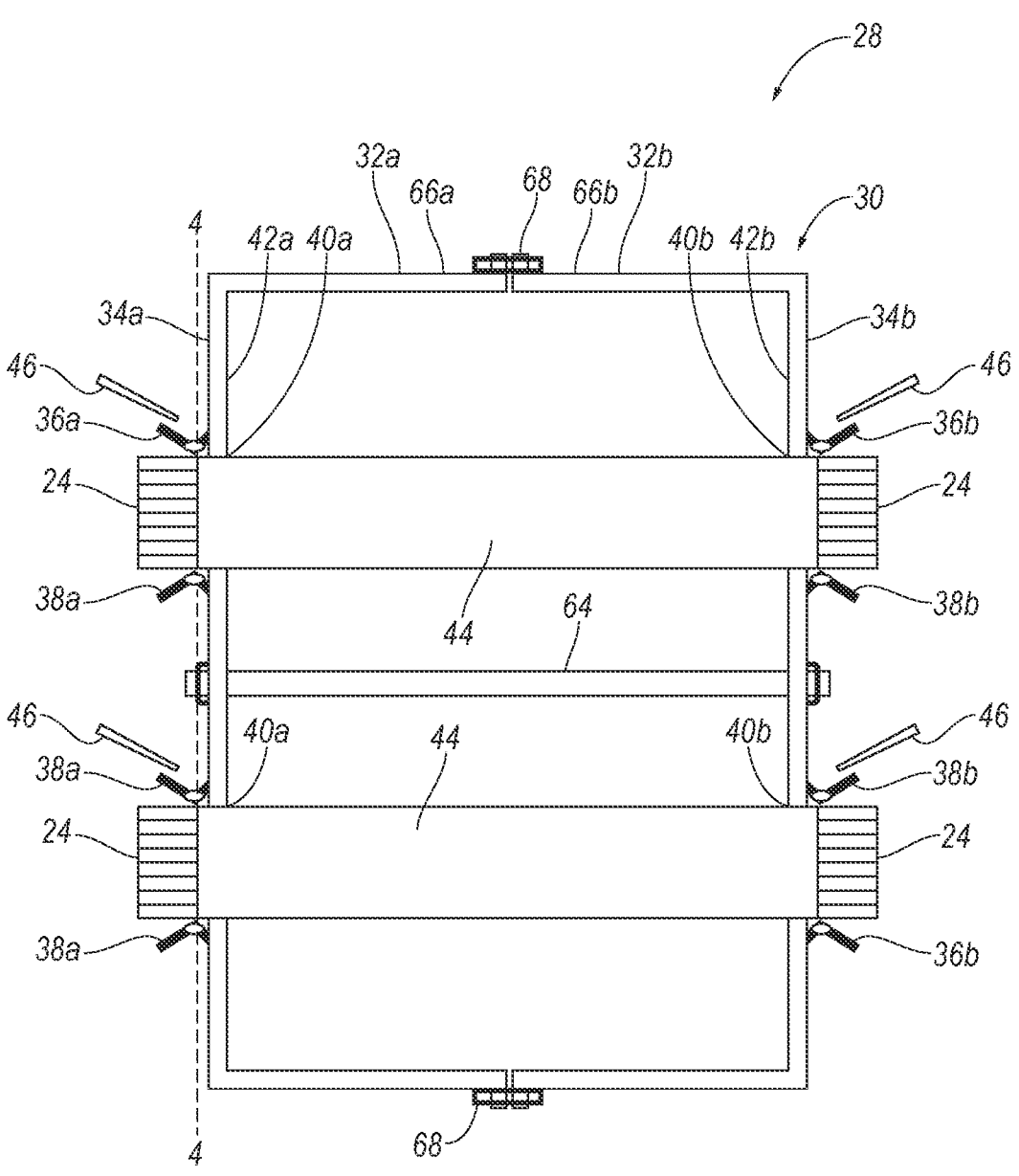
FIG. 3 is a cross-sectional sliced view of a motor assembly tool according to the present disclosure.
Figure 4:
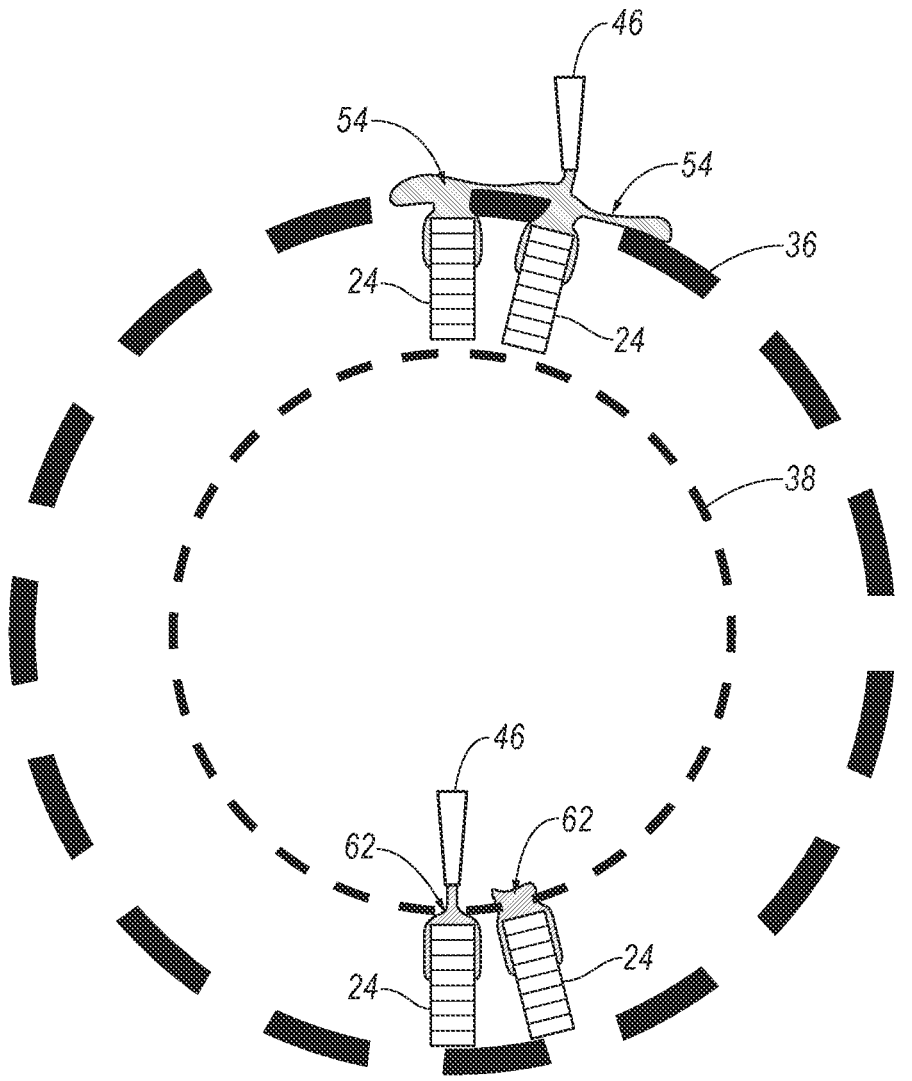
FIG. 4 is a cross-sectional view of the motor assembly tool along the line 4-4 of FIG. 3 according to the present disclosure.

With reference to FIGS. 2-4, in one form, a motor assembly tool 28 includes a varnish application fixture 30 and the stator core 22. The varnish application fixture 30 is configured to direct varnish onto the wires 24 in the slots 26. The varnish application fixture 30 has two portions 32a, 32b (generally, portion 32), each portion 32 including a disc 34a, 34b, an outer shield 36a, 36b, an inner shield 38a, 38b, and a case 66a, 66b (generally, disc 34, outer shield 36, inner shield 38, case 66). In the following, parts of a first portion 32a may be identified with an "-a" suffix, and parts of a second portion 32b may be identified with a "-b" suffix.

The disc 34 defines a plurality of slots 40, which are designed such that a geometry of the slots 40 of the disc 34 conforms to a geometry of the slots 26 of the stator core 22. That is, the slots 40 of the disc 34 are sized to be approximately the size of the slots 26 of the stator core 22, to within acceptable machining tolerances. Accordingly, the wires 24 disposed in the slots 26 of the stator core 22 extend through the slots 40 of the disc 34. As shown in FIG. 3, with the stator core 22 arranged in the fixture 30, the disc 34a of the portion 32a is disposed on an outer surface of the stator core 22, i.e., a "face" 42a of the stator core 22. The disc 34b of the second portion 32b is disposed on an opposing second face 42b of the stator core 22. The wires 24 are surrounded by a paper layer 44 extending through the slots 40 of the discs 34. As described herein, varnish injectors 46 deposit varnish onto the wires 24, and the varnish flows via capillary action through the slots 40 of the discs 34 and along the slots 26 of the stator core 22.

The outer shield 36 is disposed on the disc 34 radially outward of the slots 40. The slots 26 of the stator core 22 are arranged circumferentially and define an outer circumference, and the outer shield 36 is adapted to extend around the outer circumference of the slots 26, as shown in FIG. 4.

In one form, as shown in FIG. 2, the outer shield 36 defines a channel 48 having and defining surfaces 50 sloped toward a center portion of the disc, the sloped surfaces 50 meeting at a well 52. The well 52 defines one or more holes 54 to have varnish accumulate in the well 52 to flow therethrough onto the wires 24, as shown in FIG. 4. Specifically, the outer shield 36 is arranged to align the sloped surfaces 50 of the channel 48 with one of the varnish injectors 46 disposed radially outward of the outer shield 36. Accordingly, varnish flows along the surfaces 50 toward the well 52, down the holes 54 and radially inward onto wires 24 of the stator core 22 and into the slots 26 of the stator core 22.

The inner shield 38 is disposed on the disc 34 radially inward of the slots 40, and thus, would be radially inward of the slots 26 of the stator core 22. That is, the slots 26 of the stator core 22 are arranged circumferentially and define an inner circumference, and the inner shield 38 is adapted to extend around the inner circumference of the slots 26, as shown in FIG. 4. In one form, the inner shield 38 defines a channel 56 having surfaces 58 sloped away from the center portion of the disc 34, the sloped surfaces 58 meeting at a well 60. The well 60 defines one or more holes 62 to have varnish accumulate in the well 60 to flow therethrough onto the wires 24. The inner shield 38 is arranged to align the sloped surfaces 58 with one of the varnish injectors 46 disposed radially inward of the inner shield 38. Accordingly, varnish flows along the surfaces 58 toward the well 60, down the holes 62 and radially outward onto wires 24 of the stator core 22 and into the slots 26 of the stator core 22.

In one form, the case 66 extends from an outer edge of the disc 34 along an outer radial surface of the stator core 22. As shown in FIG. 3, the case 66a extends in an axial direction away from the face 42a of the stator core 22, and the case 66b extends in an axial direction away from the face 42b of the stator core 22. The varnish application fixture 30 includes one or more fasteners 68 joining the case 66a to the case 66b to encapsulate the stator core 22. In this form, the fasteners 68 are bolts connecting the cases 66a, 66b. The cases 66a, case 66b inhibit excess varnish that may flow away from the shields 36, 38 from accumulating on the outer radial surface of the stator core 22. That is, varnish from the varnish injectors 46 may accumulate in the channel 48 and, before flowing onto the wires 24, the stator core 22 may be rotated such that the channel 48 faces downward in the direction of gravity. The accumulated varnish may then flow by gravity toward the outer radial surface of the stator core 22 and onto the case 66.

In one form, the case 66 is integrally formed with the disc 34. In another form, not shown, the case 66 and the disc 34 are separately formed and later connected to form the portion 32. In yet another form, the varnish portion 32 lacks the case 66, only including the disc 34 and the shield 36, 38.

In addition to the fasteners 68, in one form, the varnish application fixture 30 further includes an internal fastener 64 to secure the portions 32a, 32b of the fixture 30 to each other. In one form, the internal fastener 64 is at a center portion of the inner shield 38 to extend through an axial opening of the stator core 22, connecting the disc 34a disposed on the face 42a to the disc 34b disposed on the face 42b. In the form of FIG. 3, the internal fastener 64 is a bolt fixed at opposing ends with a respective nut engaging the respective disc 34a, 34b of the fixture 30. It is within the scope of the present disclosure to include only one of the internal fastener 64 or the fasteners 68.

During operation of the motor assembly tool 28, the varnish injectors 46 apply varnish vertically downward onto the outer and inner shields 36, 38, which direct the varnish onto the wires 24 in the slots 26. Then, the motor assembly tool 28 is rotated by a fixture (not shown) to align different wires 24 with the varnish injectors 46, thereby applying varnish to those different wires 24. The motor assembly tool 28 is rotated to at least one complete revolution such that each of the wires 24 receives varnish from the varnish injectors 46 via the shields 36, 38. The shields 36, 38 thus reduce excess varnish application by directing the varnish onto the wires 24 that may otherwise accumulate and flow away from the slots 26.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A motor assembly tool, comprising:
   a stator defining a plurality of slots; and
   a varnish application fixture comprising:
      a disc defining a plurality of slots;
      an outer shield disposed on the disc radially outward of the plurality of slots of the disc; and
      an inner shield disposed on the disc radially inward of the plurality of slots on the disc,
   wherein the disc is disposed on the stator and the outer and inner shields are configured to direct varnish through the plurality of slots of the disc and into the plurality of slots of the stator.

2. The motor assembly tool of claim 1, further comprising a plurality of wires, each of the plurality of wires extending through each of the plurality of slots of the stator.

3. The motor assembly tool of claim 2, wherein each wire includes a paper layer, the paper layer extending through the respective slot of the disc in which the wire is disposed.

4. The motor assembly tool of claim 1, wherein the outer shield comprises a sloped surface sloped toward a center portion of the disc and defines a plurality of holes to direct varnish to the plurality of slots of the disc.

5. The motor assembly tool of claim 4, wherein the plurality of slots of the stator define an outer circumference and an inner circumference, and the outer shield extends around the outer circumference of the plurality of slots of the stator.

6. The motor assembly tool of claim 4, wherein the outer shield is arranged to align the sloped surface with a varnish injector disposed radially outward of the outer shield.

7. The motor assembly tool of claim 1, wherein the inner shield further comprises a sloped surface sloped away from a center portion of the disc and defines a plurality of holes to direct varnish into the plurality of slots of the disc.

8. The motor assembly tool of claim 7, wherein the plurality of slots of the stator define an outer circumference and an inner circumference, and the inner shield extends around the inner circumference of the plurality of slots of the stator.

9. The motor assembly tool of claim 7, wherein the inner shield is arranged to align the sloped surface with a varnish injector disposed radially inward of the inner shield.

10. The motor assembly tool of claim 1, wherein the varnish application fixture further comprises a fastener extending axially through a center portion the disc radially inward of the inner shield.

11. The motor assembly tool of claim 10, wherein the disc is disposed on a first face of the stator and the varnish application fixture further comprises a second disc disposed on a second face of the stator opposite the first face, the fastener connecting the disc and the second disc through an axial opening of the stator.

12. The motor assembly tool of claim 1, wherein the varnish application fixture further comprises a case extending from an outer edge of the disc along an outer surface of the stator.

13. The motor assembly tool of claim 1, wherein the outer shield is configured to direct varnish radially inward into the plurality of slots of the stator and the inner shield is configured to direct varnish radially outward into the plurality of slots of the stator.

14. The motor assembly tool of claim 1, wherein a geometry of the slots of the disc conforms to a geometry of the slots of the stator.

15. A varnish application fixture for a stator of an electric motor, the fixture comprising:
   a first portion comprising:
      a first disc defining a plurality of slots;
      a first outer shield disposed radially outward of the plurality of slots of the first disc;
      a first inner shield disposed radially inward of the plurality of slots of the first disc; and
      a first case extending from an outer edge of the first disc,
   a second portion comprising:
      a second disc defining a plurality of slots;
      a second outer shield disposed radially outward of the plurality of slots of the second disc;
      a second inner shield disposed radially inward of the plurality of slots of the second disc; and
      a second case extending from an outer edge of the second disc,
   wherein the first and second portions encapsulate the stator to direct varnish through the plurality of slots of the first and second discs into the stator.

16. The fixture of claim 15, further comprising a fastener extending from a center portion of the first disc to a center portion of the second disc, the fastener joining the first and second portions to encapsulate the stator.

17. The fixture of claim 15, wherein the first outer shield further comprises a surface sloped toward a center portion of the first disc and defines a plurality of holes to direct varnish into the plurality of slots of the disc.

18. The fixture of claim 15, wherein the first inner shield further comprises a surface sloped away from a center portion of the first disc and defines a plurality of holes to direct varnish into the plurality of slots of the disc.

19. The fixture of claim 15, further comprising a fastener joining the first case to the second case to encapsulate the stator.

\* \* \* \* \*